US007495229B2

(12) United States Patent
Beyerle

(10) Patent No.: US 7,495,229 B2
(45) Date of Patent: Feb. 24, 2009

(54) MULTI-ANODE RADIATION DETECTOR

(76) Inventor: Albert G Beyerle, 5959 Hollister, Suite C, Goleta, CA (US) 93117

( * ) Notice: Subject to any disclaimer, the term of this patent is extended or adjusted under 35 U.S.C. 154(b) by 326 days.

(21) Appl. No.: 11/164,649

(22) Filed: Nov. 30, 2005

(65) Prior Publication Data

US 2008/0169424 A1 Jul. 17, 2008

Related U.S. Application Data

(60) Provisional application No. 60/594,440, filed on Apr. 7, 2005.

(51) Int. Cl.
*H01J 47/00* (2006.01)
*G01T 1/18* (2006.01)

(52) U.S. Cl. .............................. 250/385.1; 250/214 VT

(58) Field of Classification Search .............. 250/385.1, 250/375, 281, 282, 214 VT
See application file for complete search history.

(56) References Cited

U.S. PATENT DOCUMENTS

| | | | | |
|---|---|---|---|---|
| 4,376,892 | A * | 3/1983 | Charpak et al. | 250/372 |
| 4,999,501 | A * | 3/1991 | Lacy | 250/385.1 |
| 6,078,039 | A * | 6/2000 | Lacy | 250/214 VT |
| 6,486,468 | B1 * | 11/2002 | Lacy | 250/282 |
| 6,546,070 | B1 * | 4/2003 | Francke | 378/51 |
| 7,078,704 | B2 * | 7/2006 | Lacy et al. | 250/385.1 |
| 2003/0178572 | A1 * | 9/2003 | Takahashi | 250/385.1 |
| 2005/0056775 | A1 * | 3/2005 | Cody et al. | 250/281 |

* cited by examiner

*Primary Examiner*—David P. Porta
*Assistant Examiner*—Mark R Gaworecki
(74) *Attorney, Agent, or Firm*—Felix L. Fischer

(57) ABSTRACT

A nuclear radiation detector is disclosed wherein the capacitance of the detector is significantly reduced. This improvement results in more efficient and accurate measurements of radiative entities. The design also permits greater packing density in applications requiring large arrays of radiation detectors, such as would be needed in the monitoring systems of nuclear power plants. Moreover, the disclosed design reduces costs associated with detector arrays by enabling neighboring elements to share critical components.

12 Claims, 4 Drawing Sheets

MULTI-ANODE RADIATION DETECTOR

FIELD OF THE INVENTION

The present invention relates to nuclear radiation detectors, more particularly to a gas, liquid gas, or liquid semiconductor nuclear radiation detector, wherein the capacitance of the detector is reduced without sacrificing detection volume.

BACKGROUND AND PRIOR ART

Radiation is all around us, every minute of every day. The harnessing of radiation is one of the most significant achievements of the past century. The use of radiation enables one with such power that it tends to extract the extremes of human behavior, both good and bad. The ability to monitor and control radiation levels in each instance of its use is of concern to the entirety of humankind.

Radiative particles can be characterized by energy, mass, and charge. The detection of a radiative particle requires the presence of a medium that is sensitive to the energy, mass, and/or charge of the particle of interest. The medium must be held under conditions of strict constraint so that any reaction can be uniquely attributed to an encounter with the radiative particle.

Gamma rays are massless, chargeless high energy particles. Because they are massless and chargeless, the appropriate medium is one that is sensitive to the high energy of the gamma ray. A gas, liquid gas or liquid semiconductor fulfills such a need.

The atomic structure of the medium must be characterized by an energy level architecture that can be disturbed in a measurable way by the high energies resulting from a gamma ray encounter. The nature of disturbance is such that one or more atomic electrons are dislodged upon each encounter in a process called ionization. A single gamma will produce many such electrons, the number of which is directly proportional the original gamma energy.

Once electrons have become ionized, they must be counted in order to deduce the gamma ray energy. This usually means the electron must be subjected to the force of an electric field that pulls it to a collection surface called the anode. However, one must be aware of the fact that it is possible for the electron to be reabsorbed by the gas before arrival at the collection surface.

The favored geometry for a gas, gas-filled or liquid semiconductor detector is a closed coaxial cylindrical volume. A potential difference exists between the inner and outer cylindrical surfaces, the former of which can be simply a wire collinear with the axis of the cylindrical structure. Most often the inner surface, the anode, is held at positive potential while the outer surface, the cathode, is grounded. A medium known to be reactive to the energy of the radiation of interest is confined at within the volume between the cylindrical surfaces.

Incoming radiation penetrates the outer cylindrical wall and interacts with the active substance. Such interactions result in the dislodging of electrons within the atomic structure of the semiconductor. The freed electrons are then subjected to the force of the electric field resulting from the potential difference between the inner and outer cylindrical structures. Electrons are attracted to the inner surface while positively charged residual entities are attracted to the outer surface. The total charge collected, usually only on the inner surface, is proportional to the energy of the incoming radiation.

In order for such a signal to be effectively detected, all the charge from one event must be swept from the collection area before the next event occurs. The detector's capacitance, i.e., its tendency to store charge, is an impediment to this process. Because the capacitance is directly proportional to its length, the efficient performance of a gas-filled detector is highly impacted by the length of the cylindrical assembly.

On the other hand, many molecules must be available for interactions to occur. This dictates the need for high density and/or detection volume of the active medium. Detection volume is directly proportional to length of the cylindrical assembly and to the square of its radius. Accordingly, the need to minimize the detection length in order to preserve low capacitance is in direct opposition to the need for maximizing it in order to provide detection volume.

Detection volume can also be increased by an increase in radius. However, an increased radial dimension results in an increased path length that a freed electron must travel in order to get to the positively charged inner surface and be counted. The longer the path length that the freed electron must travel, the more likely it is to be reabsorbed by the gas. If the electron is reabsorbed, it is not counted.

Even if the above considerations are well balanced, the signal resulting from charge collection competes with inherent sources of noise in the circuit, most notably that due to the so-called "series current". A lower detector capacitance enables the signal to overcome the noise. Such considerations elucidate the need for a detection system having a volume dimensioned in such a way that it does not retain a high capacitance, while still providing a sufficient probability of capturing incoming radiation without reabsorbing it.

In the past, such problems have been solved by simply segmenting the detector system. An array of single detectors satisfies both concerns. The total detection volume is the sum of the array segments while the capacitance is limited to the capacitance of only one segment. However, the resulting duplicity in electronic components results in significantly increased cost and maintenance. Moreover, an array of prior art radiation detectors possesses a significant amount of "dead space", simply due to the dimensional requirements of each packaged detector element and its peripheral components. Consequently, detector arrays are only a partial solution to the problem.

It is an objective of the present invention to provide a detector with increased detection volume, resolution, and efficiency, without increased detector capacitance.

It is an objective of the present invention to provide a detector to be used as an array element, wherein the use of the many such detectors enables maximum packing density while minimizing the cost of ancillary components.

The above objectives are met by enclosing multiple detection units within a single external structure forming a large segmented detector wherein each segment has good resolution but the share common elements. In the exemplified embodiment, two detectors arranged in tandem share a common cathode structure and pressure vessel but have separate anode structures and signal leads. This effectively doubles the detection volume without doubling the capacitance and yet still avoids undue duplication of components. The yoking of multiple units in this manner allows sharing of a filling port, high voltage power supply, pressure relief, and pressure vessel. Because the latter must generally meet the Department of Transportation Regulations (for example (CFR 49)) significant cost savings are enjoyed by avoidance of its duplication.

SUMMARY

A radiation detector having a multi-anode configuration is disclosed. The radiation detector comprises a pressure vessel and an anode supported within the pressure vessel. The anode has a plurality of charge collection sites, wherein each of the plurality of charge collection sites is electrically insulated from each other.

A cathode is supported in spaced relation from the anode; the spaced relation defines a volume therebetween. The volume is filled with a gas, liquid gas or liquid semiconductor capable of becoming ionized by radiative particles. A fixed voltage potential is maintained between the anode and the cathode, enabling the collection of charge on the anode as a result of the gas, liquid gas or liquid semiconductor being ionized by the radiative particles.

A plurality of charge collection means operable for collecting the charge from each of the plurality of charge collection sites is provided. Each of the plurality of charge collection means is electrically independent from the other. Means are provided as well for relating the energy of each radiative particle to the charge collected from the plurality of charge collection means.

DETAILED DESCRIPTION OF THE PREFERRED EMBODIMENTS

The term "nuclear radiation detector", as used herein, is intended to include the use of gas, liquefied gas, and liquid semiconductors as the active medium.

DESCRIPTION OF NUMERALS USED IN THE FIGURES

Figure 1:
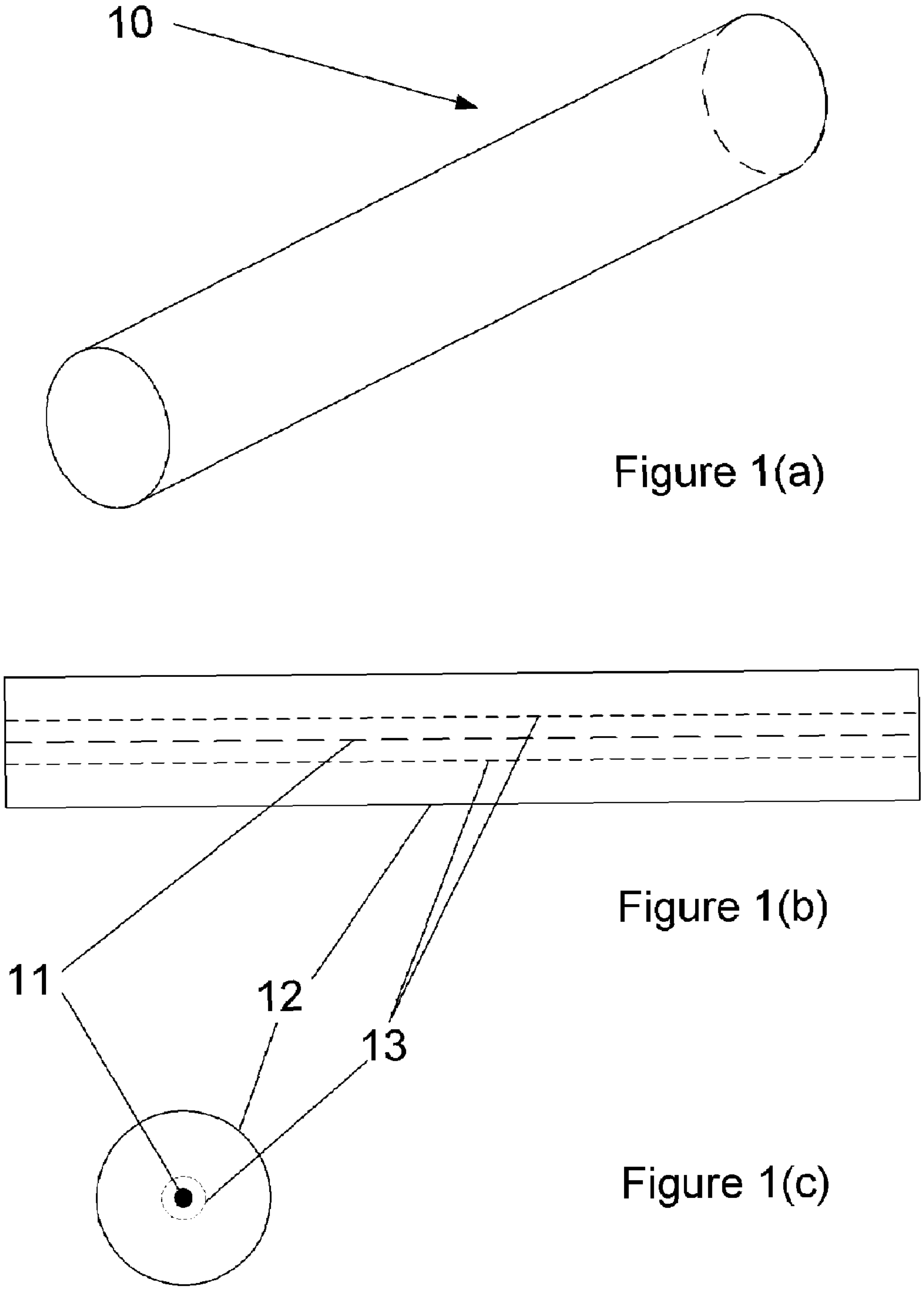
FIG. 1: General cylindrical configuration of a gas, liquid gas, or liquid semiconductor detector.

10—cylindrical structure of a typical gas, liquid gas, or liquid semiconductor detector
11—Inner cylindrical surface, anode
12—Outer cylindrical surface, cathode
13—optional grid
20—Incoming gamma ray
21—Electron dislodged as a result of gamma interaction
22—Direction of force experienced by dislodged electron
30—Pressure vessel
31—Electrical feed through
32—Signal connection
33—Fill port
34—Pressure relief structure
40—Optional center support structure FIG. 1 illustrates the cylindrical structure (10) of a typical gas, liquid gas, or liquid semiconductor detector. A perspective view is shown in FIG. 1(*a*), a side view in FIG. 1(*b*), and an end-on view in FIG. 1(*c*). The inner cylindrical surface (11) generally functions as an anode and the outer cylindrical surface (12), as a cathode. Often the anode (11) is simply a wire extending the length of the cylindrical axis. An optional grid (13) is indicated as well.

Figure 2:
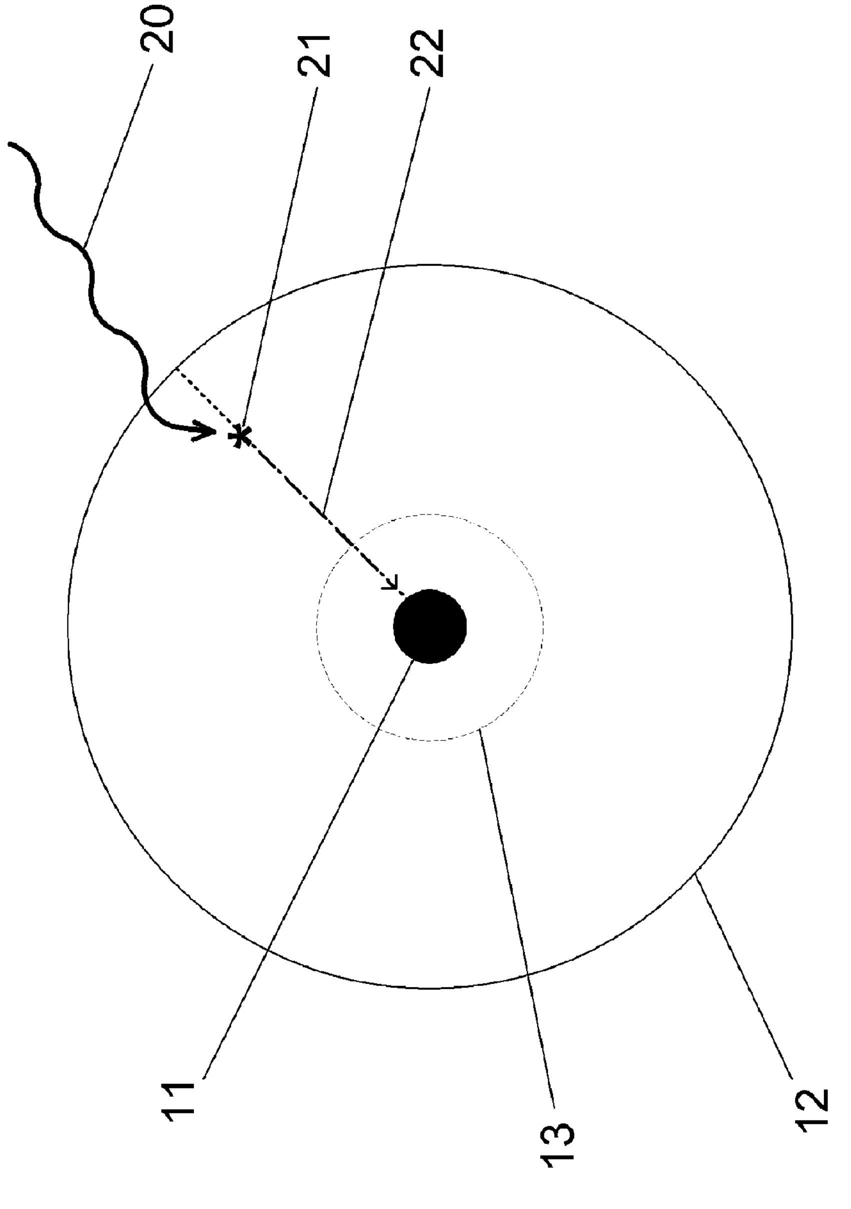
FIG. 2: General depiction of the forces acting on a dislodged electron.

FIG. 2 illustrates the processes involved in gamma detection. An incoming gamma ray (20) interacts with atoms comprising the gas, liquid gas, or liquid semiconductor. The result of such an interaction is the release of one or more atomic electrons (21). Being freed from their atomic constraints, the electrons (21) experience a force (22) due to the potential difference between the anode (11) and the cathode (12). The force (22) is in the radial direction and is perpendicular to both the anode (11) and cathode (12). Consequently, electrons are drawn to the surface of the anode and collected.

The total number of electrons collected for one event is proportional the original energy of the incoming gamma ray. In a practical sense, the easiest method of counting electrons is to intercept their path (22) with a gridded surface (13) that is coaxial with the cylindrical structure of the vessel (10). A fixed potential difference between the gridded surface (13) and the anode (11) imparts a relatively uniform acceleration to each electron. This enables each electron to contribute an approximately equal amount to the resulting pulse. Consequently, the overall pulse height is directly proportional to the total number of electrons counted, which is in turn proportional to the original energy of the impinging gamma ray.

The grid adds cost and complexity to the detector. An alternative approach to incorporating the grid structure involves performing a close analysis of the unadulterated pulses as described in application Ser. No. 10/857,207 herein incorporated by reference. (Inventorship in the immediate application is identical to that of Ser. No. 10/857,207). The cited application describes a computational engine that infers the total number of electrons contributing to a pulse via a detailed analysis of the pulse shape as opposed to a simple measurement of pulse height. Nevertheless, regardless of the approach used, the original energy of the impinging radiative particle can be determined by a correct tallying of the total number of electrons ionized by the particle.

Figure 3:
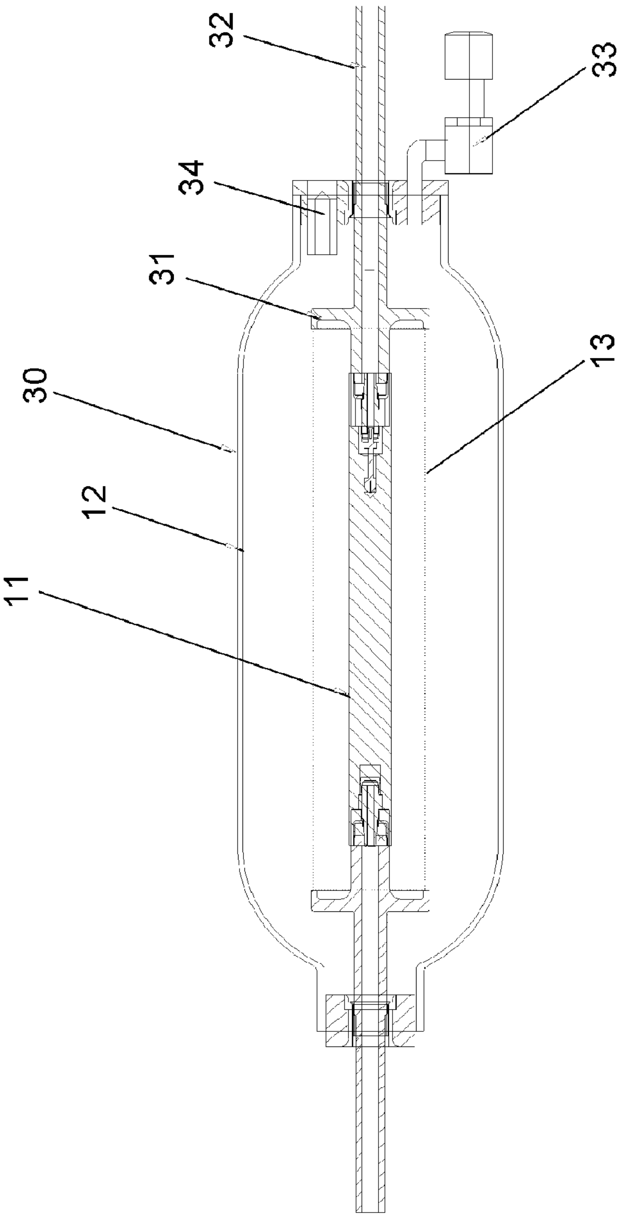
Figure 3 PRIOR ART
FIG. 3: Standard single anode gas, liquid gas, or liquid semiconductor detector.

FIG. 3 depicts a standard single anode radiation detector. The anode (11) and cathode (12) are indicated as well as the electrical feed through (31), signal connection (32) and fill port (33). The surrounding pressure vessel (30) also encloses a pressure relief structure (34) and the optional grid structure (13). In order to double the detection volume using this type of device, two such detectors must be positioned in close proximity. All above mentioned components must be duplicated. In addition, the physical dimensions of the detector and its ancillary components dictates the occurrence of "dead space" between the individual units.

Figure 4:
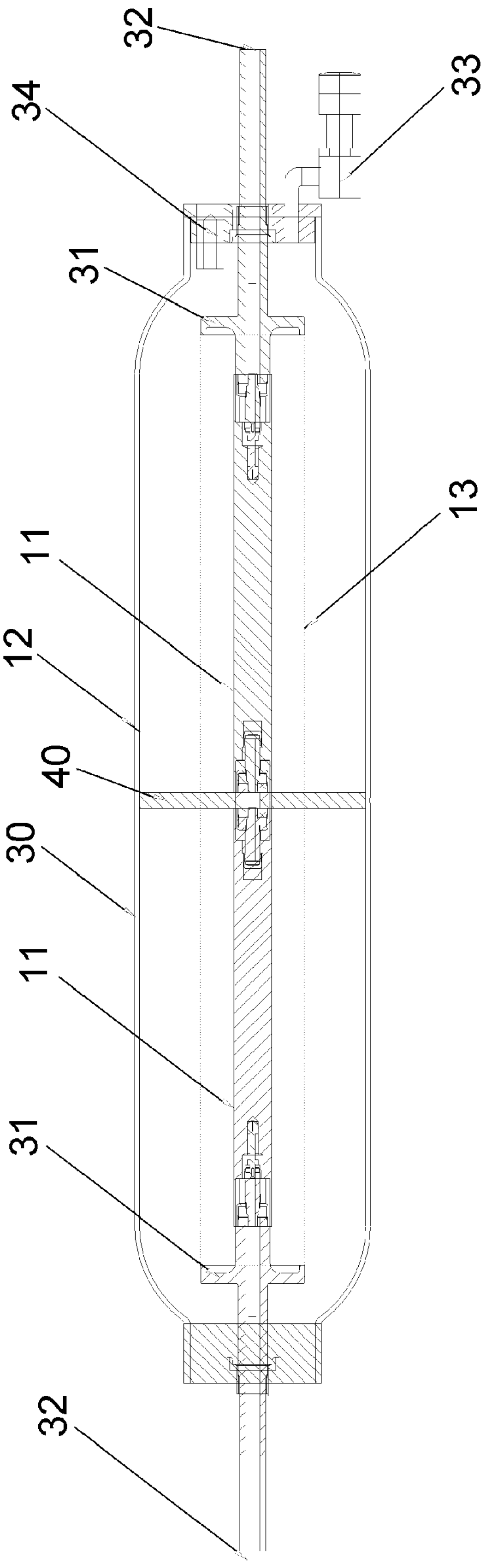
FIG. 4: Double anode embodiment of the multi-anode radiation detector

FIG. 4 depicts a double anode gas, liquid gas, or liquid semiconductor detector. Separate anodes (11), signal feed through (31), and signal leads (32) operate in a common pressure vessel (30) and cathode structure (12). They also use a common fill port (33) and pressure relief structure (34). If required, the anode (11) may incorporate a central supporting structure (40), however this structure need not withstand the pressure of the fill medium. The optional grid (13) may be included as well.

Assuming that the overall length and radius of the FIG. 3 detector is the same as that of FIG. 4, it follows that the detection volume of the former is the same as the latter. By the same token, the capacitance per unit detector length is the same as well. In the case of FIG. 4, however, the design actually encompasses two detectors within a single vessel, each of which is only half as long as the detector of FIG. 3. Consequently, the capacitance for each element of FIG. 4 is only half the capacitance of the FIG. 3 design. Because the overall capacitance for each design is limited to the capacitance of its smallest element, the overall capacitance for the segmented detector of FIG. 4 is only half the capacitance of that for FIG. 3 even though the total detection volumes are the same.

While particular embodiments of the present invention have been illustrated and described, it would be obvious to those skilled in the art that various other changes and modifications can be made without departing from the spirit and scope of the invention. For instance, the composite detector of FIG. 4 could be divided into three or four sections rather than only the two that are shown. The capacitance as compared to a single anode design would be reduced by factors of three and four, respectively. It is therefore intended to cover in the appended claims all such changes and modifications that are within the scope of this invention.

What is claimed is:

1. A multi-anode radiation detector comprising:

a pressure vessel, an anode supported within said pressure vessel, said anode having a plurality of charge collection sites, wherein each of said plurality of charge collection sites is electrically insulated from one another, a cathode supported in spaced relation from said anode, said spaced relation defining a volume therebetween, a semiconductor filling said volume, said semiconductor being capable of being ionized by a plurality of radiative particles, wherein each of said plurality of radiative particles is characterized by an energy, voltage maintenance means operable for maintaining a fixed voltage potential between said anode and said cathode, wherein said fixed voltage potential enables the collection of charge on said anode as a result of said semiconductor becoming ionized by said plurality of radiative particles, a plurality of charge collection means operable for collecting said charge from each of said plurality of charge collection sites, wherein each of said plurality of charge collection means is electrically independent from one another, and means for relating said energy of each of said plurality of said radiative particles to a cumulative charge collected from said plurality of charge collection means.

2. A multi-anode radiation detector as in claim 1 wherein said means for relating said energy of each of said plurality of said radiative particles comprises a grid structure disposed between said anode and said cathode.

3. A multi-anode radiation detector as in claim 1 wherein said means for relating said energy of each of said plurality of said radiative particles comprises a computational analysis engine.

4. A multi-anode radiation detector as in claim 1 further comprising a single fill port in fluid communication with said volume.

5. A multi-anode radiation detector as in claim 1 further comprising a single pressure relief structure in fluid communication with said volume.

6. A multi-anode radiation detector as in claim 1 further comprising a supporting structure intermediate the charge collection sites on the anode.

7. A reduced capacitance radiation detector comprising:

a single pressure vessel, at least two axially aligned anodes supported within said pressure vessel, said anodes electrically insulated from one another, a cathode supported in coaxial spaced relation from said anodes, said spaced relation defining a volume therebetween, the capacitance between said cathode and said anodes overall capacitance reduced proportionally by the number of anodes from a respective capacitance of a single anode of length comparable to the cathode, a semiconductor filling said volume, said semiconductor being capable of being ionized by a plurality of radiative particles, wherein each of said plurality of radiative particles is characterized by an energy, voltage maintenance means operable for maintaining a fixed voltage potential between said anodes and said cathode, wherein said fixed voltage potential enables the collection of charge on said anodes as a result of said semiconductor becoming ionized by said plurality of radiative particles, at least two charge collection means operable for collecting said charge from each of said anodes, wherein each of said charge collection means is electrically independent from one another, and means for relating said energy of each of said plurality of said radiative particles to a cumulative charge collected from said at least two charge collection means.

8. A reduced capacitance radiation detector as in claim 7 wherein said means for relating said energy of each of said plurality of said radiative particles comprises a grid structure disposed between said anode and said cathode.

9. A reduced capacitance radiation detector as in claim 7 wherein said means for relating said energy of each of said plurality of said radiative particles comprises a computational analysis engine.

10. A reduced capacitance radiation detector as in claim 7 further comprising a single fill port in fluid communication with said volume.

11. A reduced capacitance radiation detector as in claim 7 further comprising a single pressure relief structure in fluid communication with said volume.

12. A reduced capacitance radiation detector as in claim 7 further comprising a central supporting structure intermediate said at least two anodes.

* * * * *